March 16, 1937.  L. R. HEIM  2,074,182
BEARING CONSTRUCTION
Filed Dec. 3, 1930   2 Sheets-Sheet 2
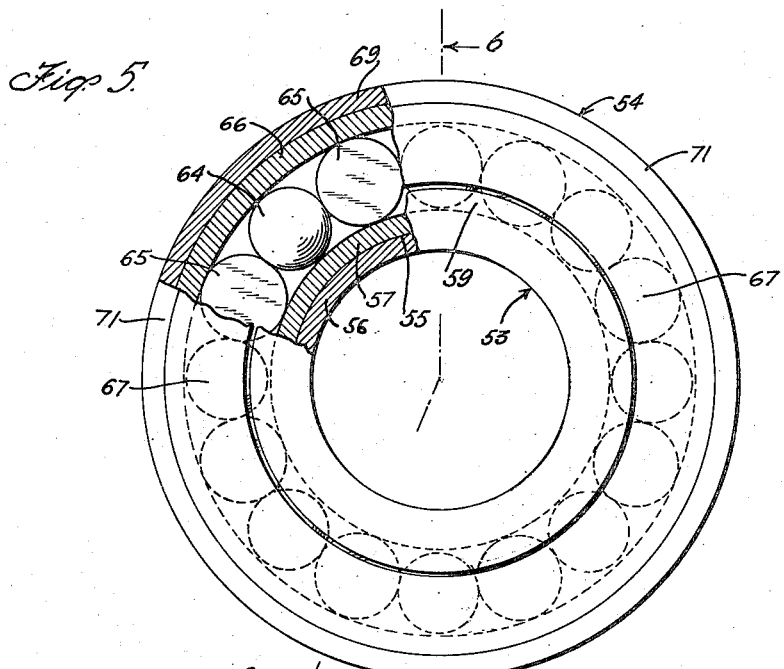
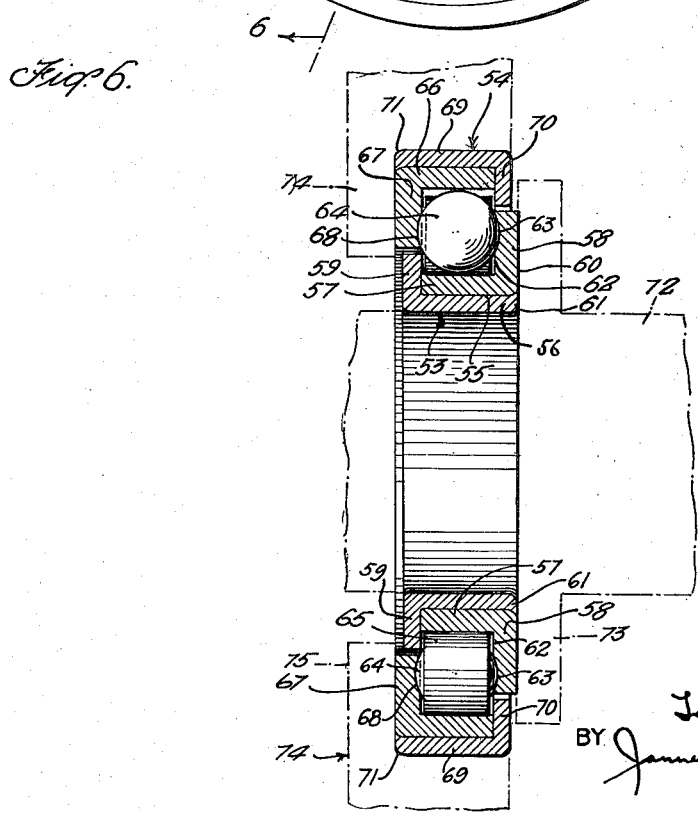

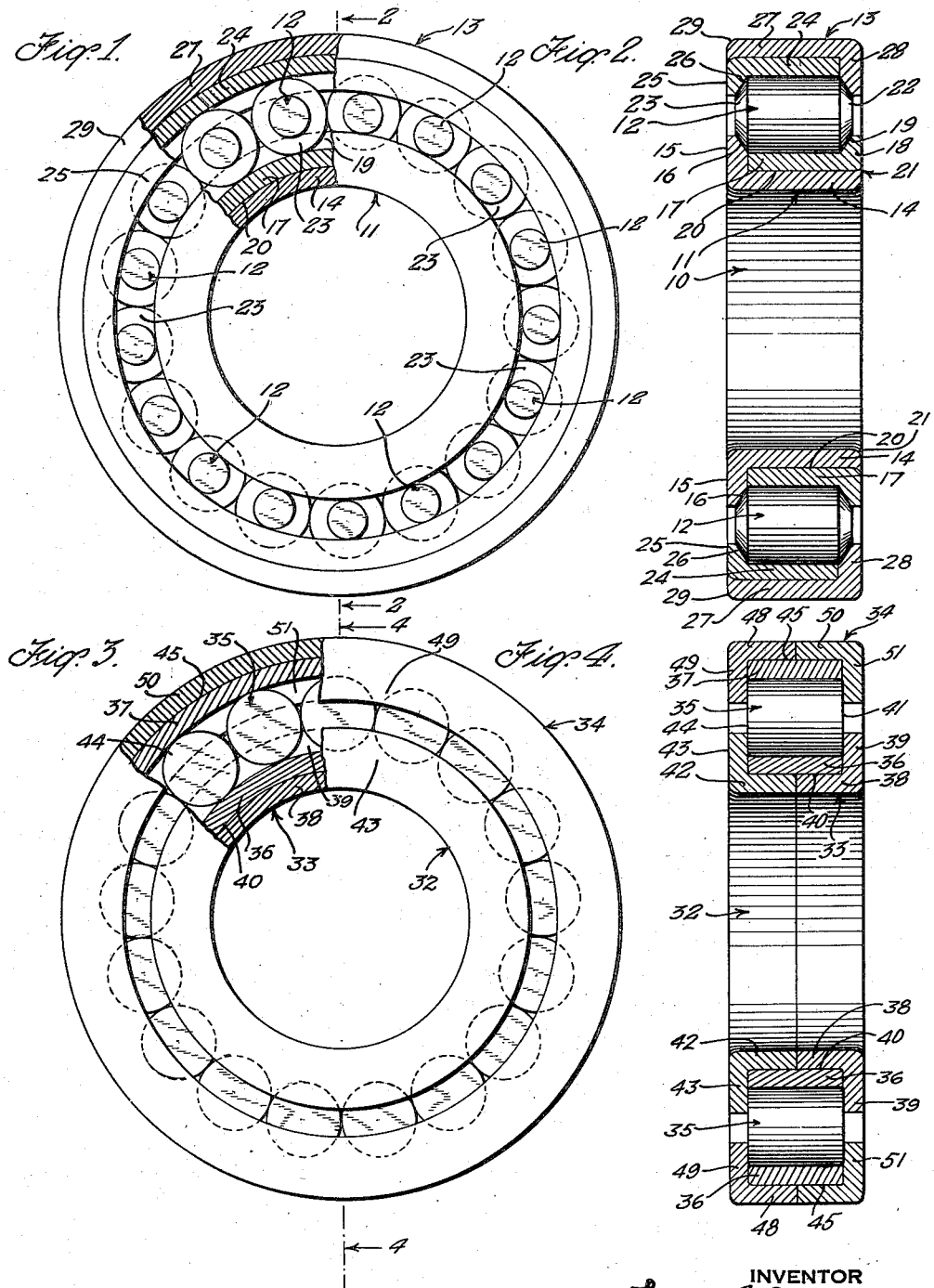

Patented Mar. 16, 1937

2,074,182

UNITED STATES PATENT OFFICE 2,074,182

BEARING CONSTRUCTION

Lewis R. Heim, Mount Dora, Fla.

Application December 3, 1930, Serial No. 499,671

18 Claims. (Cl. 308—212)

This invention relates to bearing constructions and to an art of making the same.

One of the objects of this invention is to provide a bearing construction which will be simple and thoroughly practical. Another object of this invention is to provide a device of the above nature which will be dependable and efficient in operation. Another object is to provide parts of a bearing of the above described character which will dependably retain rollers in bearings with a minimum amount of friction. Another object of this invention is to provide a device of the above character which will be of ready and economical manufacture. Another object of this invention is to provide a device of the above character of ready assembly with the minimum risk of creating defective bearings through careless workmanship, or any other cause. Another object is to provide a device of the above character which may be constructed with comparatively cheap and inexpensive materials. Another object is to provide a method of constructing bearings of the above character which will be simple, practical and readily practiced under all conditions. Another object is to provide a method of the above character which will necessitate a minimum amount of labor and mechanical facilities which may be carried on with rapidity and which will result in consistently uniform production. Other objects will be in part obvious and in part pointed out hereinafter.

The invention accordingly consists in the features of construction, combination of elements, arrangements of parts in the several steps and relation and order of each of the same to one or more of the others, all as will be illustratively described herein, and the scope of the application of which will be indicated in the following claims:—

In the accompanying drawings in which certain steps of my method are generally indicated, and in which is shown one or more of the various possible embodiments of the mechanical features of my invention:

Figure 1 is an end elevation of a bearing, certain of the parts being in section.

Figure 2 is a cross section of the bearing taken along the line 2—2 of Figure 1.

Figure 3 is an end elevation, partly in section, of another embodiment of certain features of my invention.

Figure 4 is a cross section of the bearing shown in Figure 3, taken along the line 4—4 of Figure 3.

Figure 5 is an end elevation partly in cross section of another embodiment of certain features of my invention, and Figure 6 is a cross section of the bearings shown in Figure 5 taken along the line 6—6 of Figure 5, showing certain related parts.

Similar references and characters refer to similar parts throughout the several views of the drawings.

Referring now to Figures 1 and 2 there is shown a bearing generally indicated at 10 preferably of the roller type comprising an inner race generally indicated at 11, a series of rolls 12 mounted in this race and an outer race generally indicated at 13.

At one end of a cylindrical shell 14 is a flange 15 extending outwardly and at right angles thereto. The inner surface of this flange is beveled as at 16. Fitted within cylindrical shell 14 is a second cylindrical shell 17 having a flange 18 extending outwardly at right angles thereto on the right side of the bearing 10 as viewed in the drawings and beveled as at 19. Shell 14 extends about the inner surface 20 of shell 17, fitting tightly therewithin, and may interlock therewith by a lip 21. Thus these two cylindrical shells 17 and 14 together with their spaced projecting flanges 15 and 18 form a unitary inner race for rolls 12. Rolls 12 are preferably beveled at their opposite ends 22 and 23 and these beveled ends are in substantial registry with and fit loosely between the beveled edges 16 and 19 of flanged projections 15 and 18 respectively. Thus a race is formed for rolls 12 and it will be seen that the construction above described might be used by itself as a bearing.

A cylindrical shell 24 sufficiently greater in diameter than the periphery of shell 17 to allow rolls 12 to rotate therebetween is in substantial engagement with the opposite surface of these rolls and has a projecting flange 25 extending inwardly to engage end 23 of the rolls 12. Flange 25 has a beveled edge 26 in substantial engagement with the beveled end 23 of rolls 12. Fitted tightly about the periphery of shell 24 is a cylindrical shell 27 having an inwardly projecting flange 28 to engage end 22 of rolls 12. This flange is also beveled to be in substantial registry with the beveled edge of end 22 of the rolls, and a lip portion 29 preferably extends about the opposite edge of shell 24 to interlock therewith. In this manner shell 24 and shell 27 form the outer race of bearing 10.

Referring to the action of the above-described bearing a radial thrust upon either the inner or outer race will be borne by the rolls. Under certain conditions a lateral thrust might be exerted on either side of the bearing and the force thereof would be transmitted to the beveled portions of the ends of the rolls. Thus the rolls in this case do not jam but are free to rotate in the usual manner.

The cylindrical shells used in the above construction may consist of heavy sheet metal or tubing stamped into the construction outlined above. In this manner an exceedingly durable bearing of practical and simple construction may be manufactured with extreme economy and although this bearing is cheap and of ready manufacture, it is well adapted to withstand the usual wear and tear of operation.

Turning now to Figures 3 and 4, there is shown a bearing generally indicated at 32 in Figure 4 having an inner race generally indicated at 33 and an outer race generally indicated at 34. Rolls 35 are disposed about the periphery of a cylindrical shell 36 and this shell is preferably constructed of heat treated steel having its surfaces ground and its width substantially corresponding to the length of rolls 35. A second shell 37 of substantially similar material and preferably having its inner surface ground is disposed about the outer surface of rolls 35 and the diameter of this shell is sufficiently greater than the diameter of the periphery of shell 36 to allow rolls 35 to rotate therebetween. A ring 38 having a flanged right angle projection 39 fits tightly within the inner surface 40 of shell 36. Projection or flange 39 extends outwardly a substantial distance over end 41 of rolls 35. A ring 42, similar in construction to ring 38, fits within inner surface 40 of cylinder 36 and has a projecting flange 43 extending over end 44 of rolls 35. Thus the inner race 33 for rolls 35 is constructed, and it will be understood that this runway together with rolls 35 may form a complete bearing to be used by itself under certain conditions.

Fitted tightly over outer surface 45 of cylinder 37 is a ring 48 having an inwardly projecting flange 49 in substantial registry with a portion of end 44 of rolls 35. A ring 50 similar to ring 48 is likewise fitted over surface 45 and has an inwardly projecting flange 51 in substantial registry with a portion of end 41 of rolls 35. Thus a compact independent outer race is formed for bearing 32. This bearing possesses many advantages including the ease with which it may be assembled, and the cheapness of various materials employed in its construction, as the flanged rings may be stamped from sheet metal or tubing similar to that suggested for the construction disclosed in Figures 1 and 2.

In Figures 5 and 6 there is shown another embodiment of certain features of my invention containing certain specific advantages not disclosed heretofore. Under certain conditions bearings of this type are subjected to a lateral thrust as well as a radial load such as that described above in connection with the embodiment of my invention shown in Figures 1 and 2, and, unless provision is made for this action, damage may result to the bearing. In order to provide a bearing suited to meet these conditions and employing certain fundamental features of the construction outlined herein, there is provided an inner race generally indicated at 53 and an outer race generally indicated at 54.

Fitted tightly about the periphery 55 of a cylindrical shell 56 is a cylindrical shell 57 having an outwardly projecting flange 58. Shell 56 also has an outwardly projecting flange 59 and a lip 61 opposite thereto extending about the outer surface 60 of flange 58. The thickness of shell 57 is substantially greater than the thickness of shell 56 and thus flange 58 is of greater thickness than flange 59. Furthermore, flange 58 extends outwardly a greater distance than flange 59, and in the surface 62 opposite surface 60 thereof is a groove or race 63. Thus interlocking shells 56 and 57 form an inner race, and alternately disposed about this race are balls 64 and rolls 65. Balls 64 rest on the periphery of the shell 57 and also in groove 63 of flange 58, the length of rolls 65 being less than the diameter of balls 64, and the diameter of the balls being preferably less than the diameter of the rolls.

Engaging the opposite sides of rolls 65 is a cylindrical shell 66 having a flange 67 extending inwardly over the ends of rolls 65 opposite those faced by flange 58. Flange 67 is grooved as at 68 similar to groove 63 and its thickness is greater than flange 59, this groove being in substantial registry with balls 64. In close engagement with the outer surface of shell 66 is a cylindrical shell 69 of less thickness than cylindrical shell 66, or flange 58, and a flanged projection thereof extends over the ends of rolls 65 opposite flange 58, a lip 71 engaging the outer surface of flange 67, this flange being of greater thickness than flange 70. Thus flange 58 extends in a lateral direction beyond flange 70 and flange 67 extends in a lateral direction beyond flange 59, for the radial thickness of shell 57 is greater than that of shell 69, and the radial thickness of shell 66 is greater than that of shell 56.

Turning to the action of this bearing, for purposes of illustration a driving shaft 72 is shown in Figure 6 having a flange 73 in substantial engagement with flange 58. A support member generally indicated at 74 is connected to or in substantial engagement with outer race 54 and has a flange 75 in engagement with flange 67. Any radial load imposed by members 72 and 74 is borne by rolls 65; the balls, being of smaller diameter than the rolls, remain free to roll in harmony with the rolls during the duration of this thrust. In case of a lateral thrust from member 72 the force thereof is imparted by flange 73 to flange 58 and rolls 65 being smaller than balls 64, this thrust is borne only by balls 64. Thus a lateral thrust to the left as viewed in the drawings is imparted only to flange 58 and balls 64 and as the diameter of these balls is greater than the length of the rolls, inner surface 62 of flange 58 does not come into contact with the ends of the rolls. Thus the possibility of the rolls jamming against the sides of the races is eliminated. If member 74 imposes a lateral thrust in a right hand direction as viewed in the drawings, this thrust is imparted to flange 67 by flange 75 and thence to balls 64. In this manner a thrust in either direction is taken care of by balls 64, and as rolls 65 have no part in this action, they remain free to bear the burden of a continued radial load. In this manner a radial thrust in either direction will be borne by the rolls and a lateral thrust in either direction will be borne by the balls.

It will be seen that this construction has many peculiar advantages which make it well adapted to withstand certain circumstances met with in practice. Although possessing these particular advantages, it may be constructed of cheap and inexpensive material similar to those employed in the embodiment outlined above. A further advantage found in this construction under certain conditions is the fact that this bearing is adapted to receive a maximum capacity of bearing members with no possibility of jamming regardless of whether or not any means of separating the rolls is employed therein.

It will be understood that this bearing may be of any width necessary to suit the conditions of use for which it is constructed. Further it should be noted that the beveled edges of the rolls 12 appearing in the embodiment shown in Figures 1 and 2 of the drawings are not essential to the successful operation of the bearing, merely constituting one preferred modification of the construction. All references to the word "sides" in connection with rolls signifies the lateral surfaces thereof. Similarly all reference to an inward direction signifies a direction substantially toward the axis of the bearing and reference to the word "outwardly" or synonyms therefor indicates a direction substantially toward the periphery.

The embodiments shown in Figures 1 and 2 may be formed as follows:—First the rings are made by stamping from sheet metal or flanging suitable lengths out from tubing. Next a flanged ring or shell 14, the diameter of whose periphery is slightly greater than the inner surface of flanged shell 17, is forced within this inner surface so that projection 16 extends outwardly on the end opposite projection 18. Lip 21 may be formed on the periphery of shell 14 to interlock with shell 17 by crimping with suitable dies, or this may be formed merely by the degree of endwise pressure. This is not essential in the construction of a bearing suited for many purposes. Thus a race is formed for rolls 12 and the rolls are then laid therein. It will be seen that this race, together with the rolls forms in itself a bearing well suited for certain uses.

The cylindrical rings or shell 24 the diameter of whose under surface is sufficiently greater than the diameter of the periphery of shell 17 to allow the rolls 12 to rotate therebetween, and having an inwardly extending beveled projection 25 is then placed over the outer surface of the rolls so that projection 25 extends over one end thereof. Next a cylindrical shell the diameter of whose inner surface is slightly smaller than the diameter of the periphery of shell 24 having a flanged projection extending inwardly on the opposite side from projection 25, is forced over this periphery to form a close fit therewith. The end of this shell opposite projection 25 may be crimped over shell 24 to interlock therewith as above explained. The fit on the beveled ends is sufficiently loose to permit free rotation. Thus an outer race is constructed which together with the inner race forms a complete bearing unit. This bearing may be readily handled or shipped without danger of any of the parts becoming displaced. Furthermore, the materials used in the construction thereof are cheap and inexpensive, and as the method described herein requires a minimum amount of labor the total cost of this bearing is comparatively slight. In this manner a thoroughly practical and simple method for constructing a bearing unit of durable materials is provided.

A convenient method for constructing and assembling the embodiment shown in Figures 3 and 4 is as follows:—A cylinder or ring 36 is made of heat treated steel of a width slightly larger than the length of the rolls and its outer surface is ground. Next two flanged rings 38 and 42, formed as above described, and whose peripheries are slightly larger than the inner surface of cylinder 36, are forced within this surface to form a close fit therewith so that projections 38 and 42 extend from the opposite ends of cylinder 36. Thus a race is formed for rolls and rolls are then placed about this race. A cylinder of similar material with its inner surface ground and preferably of the same width as cylinder 36, whose inner diameter is sufficiently greater than the diameter of the periphery of cylinder 36 to allow rolls 35 to rotate therebetween, is placed over the outer surface of the rolls. Two rings, 48 and 50 the diameter of whose under surfaces is slightly less than the diameter of the periphery of shell 37 and having inwardly extending flanged projections 49 and 51, are forced over cylinder 37 to form a close fit therewith so that these projections extend inwardly over and loosely fit the opposite ends of the rolls. Thus two races are formed for the rolls and a complete bearing unit is assembled. It will be seen that this construction has many advantages, one of them being a simple method of assembly while still retaining thorough durability.

The embodiment shown in Figures 5 and 6 may be constructed and assembled by a method substantially similar to that used in constructing the embodiment shown in Figures 1 and 2 as described above, the dominant features of differentiation being in the structure thereof. After the inner race of this bearing is completed, balls and rolls are disposed alternately about this race, and the outer race is assembled about the balls and rolls as described above. It will be seen that by the method above outlined this bearing having many peculiar advantages incident to its unique construction may be assembled in a simple and economical manner.

It will be seen that there is provided a construction of an essentially practical nature in which the several objects of this invention are attained.

As many other embodiments of the mechanical features of this invention may be made without departing from the scope thereof and as the art herein described may be varied it is to be understood that all matter herein set forth or shown in the accompanying drawings is to be interpreted as illustrative and not in a limiting sense.

I claim:

1. In bearing construction, in combination, a cylindrical shell having a flange on one side extending inwardly, balls and rolls disposed alternately about the inner surface of said cylindrical shell, said rolls being shorter in length than the diameter of said balls, a ring-like member telescopically fitting over said cylindrical shell and having a flange extending inwardly on opposite side from said first-mentioned flange; a second cylindrical shell whose periphery is in substantial engagement with the side of said rolls and said balls opposite said first-mentioned shell having a flange extending outwardly, and a second ring-like member telescopically fitting within said second shell and having a flange extending outwardly on the opposite side from said last mentioned flange.

2. In bearing construction, in combination, two telescopically fitting cylindrical members having flanges of uneven thickness extending inwardly to form an outer race for bearing members and two telescopically fitting cylindrical members engaging the opposite sides of said bearing members and having flanges of uneven thickness extending outwardly to form an inner race for said bearing members, the surface of the flange of said inner race on one end of said bearing members extending in a lateral direction beyond the surface of the flange of said outer race, and the surface of one flange of said outer race on the opposite end of said bearing members extending in a lateral direction beyond the surface of the flange of said inner race.

3. In bearing construction, in combination, rolls, balls havings a greater diameter than the length of said rolls, two telescopically fitting cylindrical members having flanges of uneven thickness extending inwardly to form an outer race for said balls and said rolls, and two telescopically fitting cylindrical members engaging the opposite sides of said balls and said rolls and having flanges extending outwardly to form an inner race for said balls and said rolls; the surface of the flange of said inner race opposite one end of said rolls extending in a lateral direction beyond the surface of the flange of said outer race, and the surface of the flange of said outer race at the opposite end of said rolls extending in a lateral direction beyond the surface of the flange of said inner race.

4. In bearing construction, in combination, a cylindrical race having two annular integral flanges extending inwardly adjacent the opposite ends thereof, said flanges being of uneven thickness, a second race having outwardly extending flanges of uneven thickness, rolls disposed about said races, and balls disposed about said races, the diameter of said balls being greater than the axial length of said rolls and the thickest flanges of each race being disposed upon the opposite sides of said rolls and said balls.

5. In bearing construction, in combination, an inner race comprising a pair of telescoped shells each having an annular flange to form the opposite sides of said race, the edge portion of one shell overlapping the edge portion of the other shell adjacent thereto to form an interlock between said shells, a plurality of rolling members disposed about said race, and an outer race comprising a pair of telescoped shells each having an inwardly extending flange to form the walls of said race.

6. In bearing construction, in combination, an inner race comprising a pair of telescoped shells each having an annular flange to form the opposite sides of said race, the edge portion of one shell overlapping the edge portion of the other shell adjacent thereto to form an interlock between said shells, a plurality of rolling members disposed about said race, and an outer race comprising a pair of telescoped shells each having an inwardly extending flange to form the walls of said race, said last-mentioned shells being interlocked.

7. In bearing construction, in combination, an inner race comprising a pair of telescoped shells each having an annular flange to form the opposite sides of said race, the edge portion of one shell overlapping the edge portion of the other shell adjacent thereto to form an interlock between said shells, a plurality of rolling members disposed about said race, and an outer race comprising a pair of telescoped shells each having an inwardly extending flange to form the walls of said race, the edge portion of one of said last-mentioned shells overlapping the edge portion of the other of said last-mentioned shells to form an interlock therebetween.

8. In bearing construction, in combination, an inner race comprising a cylindrical shell having an outwardly extending flange formed on one side thereof, a cylindrical shell telescopically fitted within said first-mentioned shell and having a flange extending therefrom, the free end of said last-mentioned shell being disposed adjacent the flange of said first-mentioned shell and the free edge portion of said first-mentioned shell overlapping the adjacent edge portion of said last-mentioned shell to form an interlock therebetween, a plurality of rolling members disposed about said race, and an outer race for said rolling members including a pair of telescopically interlocked shells each having one annular flange overlapping one end of said rolling members.

9. In bearing construction, in combination, an inner race comprising a cylindrical shell having an outwardly extending flange formed on one side thereof, a cylindrical shell telescopically fitted within said first-mentioned shell and having a flange extending therefrom, the free end of said last-mentioned shell being disposed adjacent the flange of said first-mentioned shell and the free edge portion of said first-mentioned shell overlapping the adjacent edge portion of said last-mentioned shell to form an interlock therebetween, a plurality of rolling members disposed about said race, and an outer race for said rolling members including a shell having a flange extending over one end of said rolling members and a shell fitted over said last-mentioned shell and having a flange extending over the other end of said rolling members, the free edge portion of said last-mentioned shell overlapping the adjacent edge portion of said third mentioned shell to form an interlock between said last two mentioned shells.

10. A bearing unit comprising, in combination, an inner race including a cylindrical shell having an outwardly extending flange formed on one side thereof, a cylindrical shell having an outwardly extending flange formed on one side thereof, said last-mentioned shell fitted tightly about said first-mentioned shell so that said flanges form the opposite sides of said race, a plurality of rolling members disposed about said race, a cylindrical shell having an inwardly extending flange fitted over said rolling members so that said flange overlaps one end of said rolling members, and a cylindrical shell tightly fitted over said last-mentioned shell and having an inwardly extending flange overlapping the opposite ends of said rolling members.

11. A bearing unit comprising, in combination, an inner race including a pair of telescopically fitted shells each having an annular flange to form the opposite walls of said race, the edge portion of one of said shells overlapping the other of said shells to form an interlock therebetween, said flanges being beveled on their inner sides, a plurality of rolls having beveled ends disposed about said race, and an outer race for said rolls including a pair of telescopically interlocked shells each having an annular flange to form the opposite sides of said outer race, said flanges being beveled on their inner sides to overlap the beveled portions of said rolls.

12. A bearing unit comprising, in combination, an inner race including a cylinder, a cylindrical member having an outwardly extending flange force fitted within said cylinder so that said flange extends above the periphery of said cylinder, a second cylindrical member force fitted within said cylinder and having a flange extending above the periphery of said cylinder on the opposite side thereof, said flanges forming the opposite sides of said race, a plurality of rolling members disposed about said race, an outer race including a cylinder fitted over said rolling members, a third cylindrical member force fitted over said last-mentioned cylinder and having an inwardly extending flange overlapping one end of said rolling members, and a fourth cylindrical member force fitted over said last-mentioned cylinder and having an inwardly extending flange overlapping the opposite ends of said rolling member.

13. In bearing construction, in combination, a cylindrical race having two annular integral flanges extending outwardly adjacent the opposite ends thereof, said flanges being of unequal thickness, a plurality of rolls and balls disposed about said race, and an outer race having inwardly extending integral flanges of unequal thickness, the thickest flange of said outer race being adjacent the thinnest flange of said inner race, said balls having a greater diameter than the axial length of said rolls and being in substantial engagement with the thickest flange of each of said races.

14. In bearing construction, in combination, an inner race comprising a pair of telescopically interlocked cylindrical members each having an outwardly extending flange, said flanges being of unequal thickness, a plurality of rolls and balls disposed about said race, the diameter of said balls being greater than the axial length of said rolls, and an outer race including a pair of telescopically interlocked cylindrical members each having an inwardly extending flange, said flanges being of unequal thickness, the thickest flange of said outer race being in alinement with the thinnest flange of said inner race, and said balls being in substantial engagement with the thickest flange of each race.

15. In bearing construction, in combination, a race including a cylinder and a cylindrical shell telescoped with said cylinder, said shell having an annular flange extending above the periphery of said cylinder and having its free edge portion overlapping the adjacent edge portion of said cylinder, a plurality of rolling members disposed about said race, and a second race including a cylinder and a cylindrical shell telescoped with said cylinder and having an annular flange extending therefrom and overlapping the ends of said rolling members opposite the ends thereof adjacent said first-mentioned flange, said last-mentioned cylindrical shell having its free edge overlapping the adjacent edge portion of said cylinder.

16. In bearing construction, in combination, a cylindrical shell having a substantially right angle annular flange formed on one side thereof, a second cylindrical shell having a substantially right angle annular flange formed on one side thereof, said shells being force fitted one within the other telescopically so that the free edge of said second-mentioned shell abuts against said annular flange of said first-mentioned shell to form an inner raceway, a plurality of balls and rolls alternately disposed about said raceway, and an outer raceway for said rolling members comprising two cylindrical shells each having a substantially right angle annular flange on one side thereof and force fitted one within the other so that the free edge of one of said last-mentioned shells abuts against the annular flange of the other of said last-mentioned shells, all of said annular flanges coacting to hold said rolling members against any substantial axial movement.

17. In bearing construction, in combination, a cylindrical member forming a race and having a flange extending inwardly therefrom, a series of rolls associated with said cylindrical member and adapted to track upon the inner periphery thereof, said rolls being arranged and disposed to bear a radial load, a plurality of balls operatively associated with said cylindrical member and disposed to track upon one of the surfaces of said flange, said balls being adapted to bear an axial thrust, and means associated with said cylindrical member for retaining said balls and said cylindrical member in related assembly, said means also including parts associated with said cylindrical member for retaining said balls and said rolls against axial displacement from their operative relationship with said cylindrical member.

18. In bearing construction, in combination, a race including a plurality of flanged cylindrical members telescopically force fitted together, the flanges of said members extending radially inwardly thereof, a series of rolls disposed about said race in tracking relation to the inner periphery of one of said members, said rolls being adapted to bear a radial load, a plurality of balls associated with said race in tracking relation to one of said flanges, said balls being adapted to bear an axial thrust, and means for retaining said balls against axial and radial displacement.

LEWIS R. HEIM.